July 24, 1928. 1,678,395
E. E. KELLEMS
SELF LOADING TRAILER
Filed Jan. 11, 1927 2 Sheets-Sheet 1
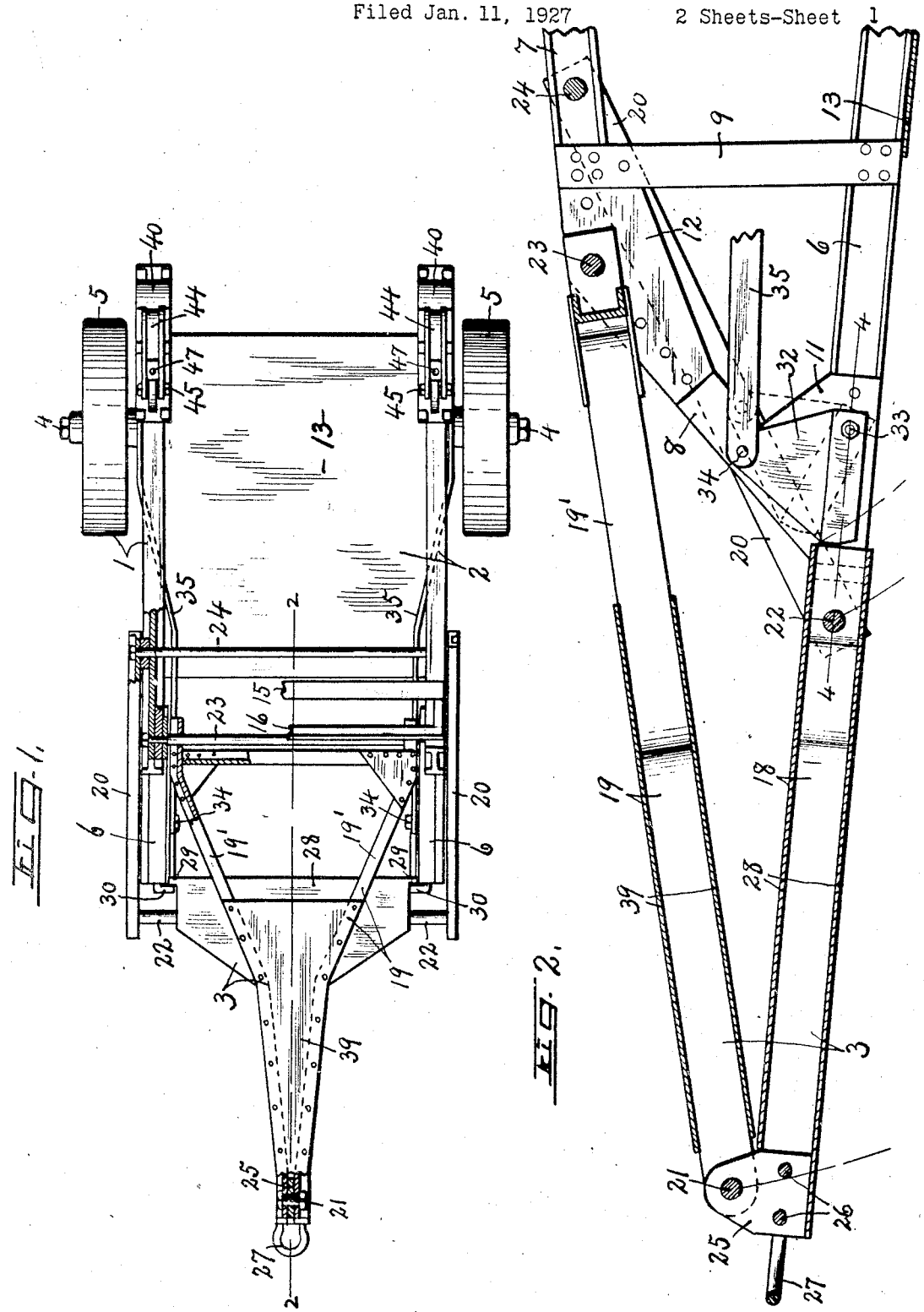
INVENTOR
E. E. Kellems
BY Denni & Thompson
ATTORNEYS
WITNESS.
H. V. Hurst

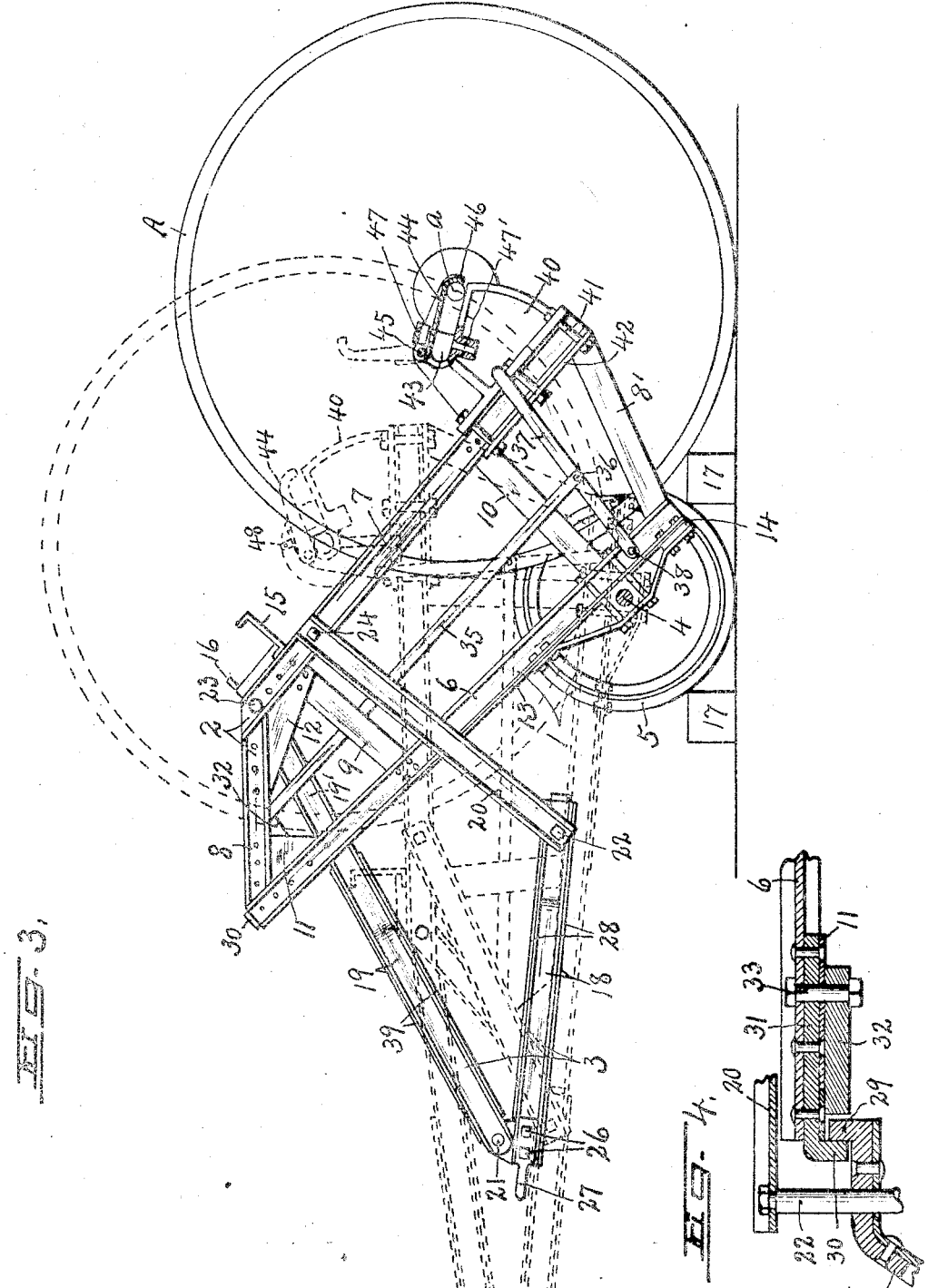

Patented July 24, 1928.

1,678,395

UNITED STATES PATENT OFFICE.

EDGAR E. KELLEMS, OF SYRACUSE, NEW YORK.

SELF-LOADING TRAILER.

Application filed January 11, 1927. Serial No. 160,378.

This invention relates to a self-loading trailer adapted to be used more particularly for loading, carrying and unloading cable reels and other heavy objects requiring transportation from one place to another.

The main object of the present invention is to provide a folding trailer consisting of a main section fulcrumed on a suitable wheel carrier for vertical tilting movement for convenience in loading and unloading the reel or other load and having a tongue section pivotally connected to the main section for swinging movement relatively thereto, with means on the front end of the tongue section for attachment to the rear end of a motor truck or other tractor whereby when the rear end of the main section is tilted rearwardly and downwardly and properly engaged with the opposite ends of the reel spindle, the forward movement of the tongue section will automatically straighten out the trailer sections and thereby lift and carry the reel upon the main section above, but slightly to the rear of, the axle of the wheels.

Another object is to construct and connect the tongue section to the main section in such manner that the draft bar of the tongue section will maintain approximately the same level during the tilting movement of the main section to different angles during the operation of loading and carrying the reel.

A further object is to provide simple and efficient means for holding the reel upon the main section when loaded thereon.

Another object is to arrange the load-carrying bearing in such relation to the fulcrum and weight of the front end of the frame section that when the sections are unlocked and released the weight of the load will automatically tilt the frame section rearwardly and downwardly for discharging said load without disconnecting the draft section from the tractor.

Another object is to provide means operable at will for locking the tongue section and main section in approximately their straightened positions to prevent tilting action of the main section when the reel is loaded thereon.

Other objects and uses relating to specific parts of the invention will be brought out in the following description.

In the drawings:—

Figure 1 is a top plan, partly in section, of a self-loading trailer embodying the various features of my invention in which the main section and tongue section are in their straigthened or approximately horizontal positions for carrying the reel, the latter being omitted.

Figure 2 is an enlarged longitudinal vertical sectional view taken in the plane of line 2—2, Figure 1.

Figure 3 is an enlarged side elevation, partly in section, of the same machine, except that the main section and tongue section are shown in their tilted and folded positions for the initial operation of loading the reel on the main section, the dotted lines indicating the positions of the main section and tongue section after the reel is loaded, said reel being shown by full lines and also by dotted lines.

Figure 4 is an enlarged detail sectional view taken in the plane of line 4—4, Figure 2.

As illustrated, this self-loading trailer comprises a two-wheel truck —1— having a main body section —2— and a tongue section —3—, the lower rear end of the main section —2— being mounted upon an axle —4— carrying suitable supporting wheels —5— on opposite ends thereof.

The main section —2— preferably consists of a rigid frame-work having opposite lengthwise sills —6— and upper lengthwise side bars —7— which are held in fixed spaced relation to the sills —6— by front and rear brace bars —8— and —8'— and by intermediate brace bars —9— and —10—, Figure 3, the front ends of the sills —6— and top bars —7— being additionally braced to the adjacent brace bars by reinforcing plates —11— and —12— for reinforcing purposes.

The lengthwise bars —6— and —7— and brace bars —8—, —8'—, —9— and —10— together with the reinforcing members —11— and —12— at each side of the machine are spaced transversely some distance apart but preferably parallel to form an open space into which portions of the reel —A— may readily enter when loaded on the truck in a manner hereinafter described.

A platform —13— is riveted or otherwise secured to the undersides of the sills to extend across the intervening space just above the axle —4— and from the rear end of the main frame section —2— forwardly some distance beyond the axle —4— or approximately in line with the brace bars —9— for receiving and supporting various implements or other objects which it may be necessary or desirable to carry with the truck.

The rear ends of the sills —6— may be connected by a cross bar —14— extending across the underside of the adjacent end of the platform —13— as shown in Figure 14 to assist in holding the opposite sides of the main frame in fixed spaced relation without in any way interfering with free access from the rear end of the machine.

The front ends of the upper lengthwise bars —7— are connected by cross bars —15— and —16— to assist in holding said lengthwise bars in fixed spaced relation and also to form a support for one or more wheel blocks —17—, Figure 3, when the latter are not used for blocking the wheels —5—.

The tongue section —3— comprises, in this instance, a substantially horizontal draft bar —18— and front and rear links —19— and —20— which are pivoted at their lower ends at —21— and —22— respectively to the front and rear ends of the draft bar —18— and are also pivoted at their upper ends at —23— and —24— respectively to the front end of the upper frame bar —7— in longitudinally spaced relation but preferably a shorter distance from each other than the distance between the pivots —21— and —22— at their lower ends.

The pivotal bolt —21— is secured to a bracket —25— which, in turn, is rigidly secured to the front end of the draft bar —18— by bolts —26—, Figure 2.

A clevis —27— is secured to opposite sides of the front end of the draft bar —18— by the same bolts —26— and forms a means of connection with the rear end of a motor truck or other draft device capable of operating the trailer to load and carry the reel —A— or similar object.

It is now evident that the links —19— and —20— are free to swing forwardly and rearwardly upon their respective pivots —23— and —24— relatively to the main frame section —2— and that they extend downwardly and forwardly from their respective pivots a sufficient distance below the sills —6— to permit the draft bar —18— to swing into alinement with the front ends of the sills when the tongue section is drawn forwardly and the main section —2— is tilted forwardly and downwardly to a substantially horizontal position as shown by dotted lines in Figure 3 and by full lines in Figure 2, the links —19— and —20— serving to hold the draft bar —18— in a substantially horizontal position and at about the same level in all positions of adjustment of the main frame —2— and tongue section —3— so as to facilitate the attachment of the clevis —27— to a truck or other draft device.

The draft bar —18— is preferably made of channel or angle irons having their forward ends converging into close proximity and their rear ends diverging rearwardly and are connected at top and bottom by reinforcing plates —28— riveted or otherwise secured thereto.

The rear end of the draft bar is provided near its outer edges with laterally projecting shoulders —29—, Figures 1 and 4, for interlocking engagement with similar inwardly projecting shoulders —30— on the front ends of the sills —6— when the frame sections —2— and —3— are straightened out.

These shoulders —30— are formed upon separate reinforcing pieces —31— which, together with the reinforcing plates —11—, are riveted or otherwise secured to the front ends of the sills —6— as shown more clearly in Figure 4.

A pair of locking dogs or pawls —32— are pivoted at —33— to the opposite sills —6— near the front ends thereof with their front edges in spaced relation to the shoulders —30— sufficient to permit the entrance of the shoulders —29— in the intervening spaces as shown in Figure 4, said pawls —32— being movable about the axes of their respective pivots —33— into and out of locking engagement with the rear faces of the shoulders —29— when the frame sections —2— and —3— are extended or straightened to hold said sections in said straightened positions against folding movement while conveying the reel from one place to another.

These pawls —32— constitute what may be termed bell-crank levers extending some distance above their respective pivots —33— and having their upper ends pivotally connected at —34— to rearwardly extending links —35—.

The rear ends of these links are pivotally connected at —36— to the intermediate portions of a pair of hand levers —37—, one of which is shown in Figure 3 as being pivoted at its lower end at —38— to the corresponding sill —6— near the rear end thereof where said levers are readily accessible for manipulation in moving the locking members —32— into and out of engagement with the shoulders —29— on the rear end of the draft bar —18—.

The link —19— also comprises forwardly extending bars —19'— converging toward their forward ends to lie in close proximity while the rear ends thereof diverge toward the inner sides of the upper lengthwise bars —7— of the main frame section —2— and are connected to the pivotal bolt —23— which extends across the space between the bars —7— as shown in Figure 1, said bars —19'— being reinforced by top and bottom plates —39— which are riveted or otherwise secured thereto.

The pivotal bolt —24— extends entirely across the space between the upper bars —7— through registering openings therein for receiving and supporting the upper ends of the links —20— which extend forwardly across the outer sides of the frame bars —6— and —7— in parallel relation and are operatively connected at their lower ends by the pivotal bolt —22— extending across the intervening space between them as shown in Figure 1, said pivotal bolt —22— also serving to receive and support the rear end of the draft bar —18— as shown in Figure 4.

A pair of brackets —40— are secured by bolts —41— and clip plates —42— to the upper faces of the lengthwise bars —7— near the rear ends thereof to extend upwardly therefrom and are provided near their upper ends with lengthwise slots —43—, the lower walls of which preferably incline forwardly and downwardly toward the bars —7— for receiving and supporting the spindle or trunnions as —a— of the reel —A—.

The upper walls —44— of the slots —43— are hinged at their front ends at —45— to the adjacent portions of the brackets —40— to swing upwardly and rearwardly to and from the lower walls of the slots and are provided at their rear ends with downwardly inclined shoulders —46— adapted, when closed, to engage the rear faces of the trunnions —a— and thereby to assist in holding the reel upon the bearings forming the lower walls of the slots —43—.

These movable top walls —44— on the brackets —40— constitute detents for locking and releasing the reel —A— upon and from the lower bearing walls of the slots —43— and together with the lower walls of said slots are provided with registering apertures —47— and —47'— for receiving suitable pins —48— by which the detents —44— may be held in their closed positions upon the trunnions —46—.

These pins —48— may be removed and replaced by hand in and from their locking positions, but it is evident that other means may be employed for holding the detents —44— in locking position without departing from the spirit of this invention.

Operation.

When a reel is to be loaded upon a truck, the levers —37— will first be operated to trip the holding pawls —32— from their locking positions through the medium of their respective links —35— after which the locking means —44— may be opened to the position shown by dotted lines in Figure 3.

The draft bar —18— may then be moved rearwardly by a tractor or other suitable force thereby causing the section —2— to be tilted upwardly and rearwardly until the open ends of the slots —43— are registered with the trunnions —a— of the reel —A—, the truck being then moved rearwardly until the trunnions —a— rest upon the lower walls of the slots —43— a sufficient distance from the rear ends thereof to permit the closing of the locking members —44—.

When the detents —44— are closed upon the trunnions —a— the draft bar —18— will be drawn forwardly thereby tilting the frame —2— forwardly and downwardly and consequently lifting the reel —A— upon the lower bearings of the slots —43— and as soon as these bearings pass beyond a horizontal plane so as to incline forwardly and downwardly the trunnions —a— will roll or slide along said bearings until engaged with the front walls of the slots —43— whereupon the pins —48— may be inserted in their respective apertures —47— and —47'— to hold the reel in operative position upon the truck, it being understood that the reel is then lifted from the ground and supported entirely by the truck which may be transported to any place desired, as, for example, where the reel is to be unloaded for installation of the conduits carried thereby.

While the reel is being loaded upon the trailer the wheels —5— may be held against movement along the pavement by the blocks —17— but as soon as the reel is properly loaded upon the trailer and the frame sections —2— and —3— are straightened out and locked in operative position by the locking members —32— and inter-engaged shoulders —29— and —30—, the blocks —17— may be removed and temporarily stored upon the cross bars —15— and —16— ready for re-use when desired.

It will be noted that when the reel is loaded upon the frame section —2— and the sections —2— and —3— straightened out and locked in their straightened position the trunnions —a— of the reel will be brought to planes above and somewhat to the rear of the wheels —5— thereby relieving the detents —44— from excessive strain by reason of the fact that the reel tends to ride down the forwardly and downwardly inclined bearings forming the lower sides of the slots —43—.

When the reel or other load is carried to its destination for unloading it is simply necessary to release the locking pawls —32— and detents —44— from their loading positions whereupon the weight of the reel or other load upon the rear end of the frame —2— at the rear of the fulcrum axle —4— will automatically tilt said frame rearwardly and downwardly until the reel or other load is automatically discharged therefrom by its own weight during which operation the supporting wheels for the truck will be moved forwardly along the ground toward the point of attachment of the draft section —3— to the tractor it being understood that the draft section will be held against rearwardly movement by said tractor during the unloading operation.

What I claim is:—

1. A two-wheel trailer having a body tiltable about the axis of the wheels, a draft bar movable endwise relatively to the body, a link pivotally connected to the rear end of the draft bar and to the body, and an additional link pivotally connected to the front end of the draft bar and to the body some distance in front of the first-named link.

2. A two-wheel trailer having a body tiltable about the axis of the wheels, a draft bar movable endwise relatively to the body, a link pivotally connected to the rear end of the draft bar and to the body, and an additional link pivotally connected to the front end of the draft bar and to the body some distance in front of the first-named link, said links being arranged to support the draft bar in substantially parallel planes as it is moved endwise relatively to the body.

3. A two-wheel trailer having a body tiltable about the axis of the wheels, and means for tilting said body comprising a draft bar movable endwise relatively to the body, links pivotally connected to the front end of the draft bar and to the front end of the body, and additional links pivotally connected to the rear end of the draft bar and to the body at the rear of the first-named links.

4. A two-wheel trailer as in claim 3 in which the distance between the pivotal connections of the links with the body is considerably less than the distance between the pivotal connections of the links with the draft bar.

5. A two-wheel trailer as in claim 3 in which the additional links are considerably shorter than the first-named links.

6. A two-wheel trailer having a body tiltable about the axis of the wheels, said body having opposite lengthwise sills and opposite lengthwise side bars in a plane above the sills, a draft bar movable endwise relatively to the body, links pivotally connected to the front end of the draft bar and to the front end of the side bars of the body, additional links pivotally connected to the rear ends of the draft bar and to said lengthwise bars at the rear of the first-named links, said links being arranged to cause the draft bar to swing into alinement with the sills at the front ends thereof when the body is brought to its load-carrying position, and means for locking the adjacent ends of the draft bar and sills to each other when the body is in said load-carrying position.

In witness whereof I have hereunto set my hand this 8th day of January, 1927.

EDGAR E. KELLEMS.